3,222,419
PRESSURE SENSITIVE ADHESIVE COMPOSITIONS
Benjamin D. Jubilee, Plainfield, and Leonard J. Fox, Union, N.J., assignors to National Starch and Chemical Corporation, New York, N.Y., a corporation of Delaware
No Drawing. Filed July 5, 1962, Ser. No. 207,815
5 Claims. (Cl. 260—836)

This invention relates to novel adhesive compositions and to a method for their preparation. More particularly, it relates to the preparation of compositions which are especially suited for use as pressure sensitive adhesives.

As is known in the art, pressure sensitive adhesives comprise a class of adhesive compositions which may be formulated from a variety of materials such as gums and resins of both natural and synthetic derivation. When coated on a suitable substrate, these adhesive compositions share the common characteristic of being aggressively and permanently tacky at room temperature and are thus able to adhere to surfaces by the application of nothing more than hand pressure. Adhesives of this type may be applied to various substrates such as paper, cloth, and plastic films, and the resulting coated substrate may then be converted to tapes and labels which are especially useful in the packaging field for any number of applications involving marking, sealing, reinforcing or banding.

In order to be satisfactory in commercial usage, a pressure sensitive adhesive must, of course, possess good tack and tack retention properties, that is, the adhesive must firmly adhere to various surfaces and the adhesive films thereof should continue to toughen on aging. An equally important property of such an adhesive in many applications is that of high internal strength, that is, good cohesion. High internal or cohesive strength is a necessary characteristic of any adhesive composition which is employed in preparing adhesive products that must support considerable amounts of weight. It is also necessary that the property of high internal strength be instilled in the adhesive without adversely affecting the adhesive's tack and tack retention properties. Previously, internal strength had been imparted to pressure sensitive adhesives by such means as incorporating high molecular weight polymers or polymers containing carboxyl groups in the adhesive formulation. Methods such as these, however, have generally proved unsatisfactory since cohesive strength was attained only at the expense of sacrificing the tack and adhesion properties of the composition.

It is the object of this invention to prepare pressure sensitive adhesives which display effective properties of tack, tack retention, and cohesive strength and which are characterized by their ready adhesion to a wide variety of substrates. Another object of this invention is the use of said adhesives to prepare pressure sensitive tapes and labels. Other objects and the advantages of this invention will be apparent from the following description.

In accordance with the invention, pressure sensitive adhesives displaying excellent tack, tack retention, and cohesive strength are prepared by blending a non-crosslinking resin with a crosslinkable resin. In such formulations, we have found that the non-crosslinking resin imparts properties of track, tack retention, and adhesion to the blend, whereas the crosslinkable resin imbues the blend with high cohesive or internal strength. The necessity of having both of these components present within our formulations is vividly demonstrated when attempts are made to prepare operable pressure sensitive adhesives containing only one of these two types of resins. Thus, adhesive formulations containing only the crosslinkable resin are found to have high internal strength, but low tack and tack retention on aging. On the other hand, pressure sensitive adhesives containing only non-crosslinking resins are characterized by high tack and adhesive strength, but low internal strength. It is therefore necessary, for the purposes of this invention, that both a non-crosslinking resin and a crosslinkable resin be present in our adhesive blends.

The resin components utilized in the adhesive blends of our invention must be compatible with each other when they are admixed. In order to assure such compatibility, the resins utilized in our blends should be closely related in structure. This similarity in structure of the resins, with the attendant compatibility thereof, is achieved by employing as crosslinking resins, in the process of our invention, copolymers differing from the non-crosslinking resins only with respect to the presence, in these crosslinking resins, of comonomers which render the resulting copolymers crosslinkable by the action of heat and/or catalysts. It should be mentioned that it is preferred to employ those polymers which are capable of cross-linking under relatively mild curing conditions, for example, by heating to temperatures ranging from about 150° F. to about 275° F. Curing may also be accelerated by the inclusion of catalysts in our blends, the concentration of such catalysts ranging from 0.1% to 1.0% by weight of the resins in the adhesive blend. We have found that para-toluene sulfonic acid is of particular utility in the curing of our formulations.

The non-crosslinking resins that may be used in formulating the adhesive blends of our invention include: copolymers of vinyl acetate with alkyl esters of acrylic or methacrylic acid wherein said alkyl groups contain from 2 to 8 carbon atoms; copolymers of vinylidene chloride with alkyl esters of acrylic or methacrylic acid wherein said alkyl groups contain from 4 to 8 carbon atoms; and homopolymers of alkyl esters of acrylic or methacrylic acid wherein said alkyl groups contain from 2 to 8 carbon atoms, the resulting acrylate polymer having a glass transition temperature (Tg) of less than —20° C. The glass transition temperature of a polymer is that temperature at which each segment of the polymer chain is free to move.

Crosslinkable resins comparable to each of the aforedescribed non-crosslinking types may readily be prepared by polymerizing mixtures of the monomeric components of the latter along with about 0.5 to 10% by weight, of the resulting copolymer, of a crosslinkable comonomer selected from among the group consisting of N-methylol acrylamide, N-methylol methacrylamide, glycidyl acrylate, glycidyl methacrylate, hydroxyethyl acrylate, hydroxyethyl methacrylate, hydroxypropyl acrylate, and hydroxypropyl methacrylate. It should be mentioned that the above described crosslinkable comonomers, other than the N-methylol acrylamide and the N-methylol methacrylamide, require a catalyst and/or higher temperature treatment in order to cure satisfactorily.

Methods for polymerizing both the non-crosslinking and crosslinkable polymers are well-known to those skilled in the art. Since these resins are generally used in the lacquer form, as will be subsequently described, it is convenient to prepare both resin types by means of organic solvent polymerization techniques. These techniques involve, in brief, the application of heat to organic solvent solutions containing the respective monomers dissolved therein along with an organic solvent soluble polymerization catalyst such as benzoyl peroxide.

The actual process involved in preparing our novel adhesives necessitates that the non-crosslinking and the crosslinkable resin lacquers be blended. Examples of the solvents used to prepare these lacquers include ethyl acetate, toluene, methyl alcohol, isopropyl alcohol, pentane, hexane, methylene chloride, cyclohexane, decahydronaphthalene, tetrahydronaphthalene, and similar compounds. In some cases, additional solvents may also be formulated so as to have a total resin solids content of from 20% to 60% by weight. The ratio of the amount of non-crosslinking resin solids to crosslinking resin solids may range from about 50:50 to 95:5, on a weight basis.

The adhesives of the present invention may also be prepared in the form of aqueous emulsions. This is readily accomplished by first adding an emulsifying agent such as alkyl phenoxy polyoxyethylene ethanol to one or both of the above described organic solvent solutions of our adhesive blends and then, under vigorous agitation, introducing water into the system with agitation being continued until an oil-in-water emulsion is produced. Completely aqueous systems can be prepared by following this same emulsification procedure and then removing the solvent by means of vacuum distillation.

After our adhesive formulations have been coated onto a suitable substrate, the formulation may be subjected to mild heating conditions so as to effect the crosslinking of the crosslinkable resin component. Our adhesives may be cured by heating at 250° F. for about 2 minutes or by allowing the adhesives to air dry at room temperature.

Various additives may be incorporated in the adhesive blends of our invention in order to modify the properties thereof. Among these additives may be included: tackifiers, such as hydrogenated methyl esters of rosin, diethylene glycol esters of rosin, and rosin derived alkyd resins; fillers and pigments, such as talc, titanium dioxide, and calcium carbonate; and, antioxidants.

In using the adhesives of our invention, they may be applied to substrates by means of any coating technique whose use is desired by the practitioner. Thus, these adhesives may be sprayed onto a substrate or they may be applied by the use of any mechanical coating process, such as air knife, trailing blade, reverse roll, or gravure coating techniques. These adhesives are usually applied at a coating weight which gives a dry film thickness of about 1 mil. The coating weights at which the adhesives are applied will, of course, vary according to the specific end use application.

Our adhesive compositions may be coated onto a virtually unlimited variety of substrates, including paper, cloth, paperboard, metal sheets and foils, fiber glass, foamed plastics, rubber, cellophane, wood, and plastic films and sheets, such as those derived from polyethylene terephthalate, polystyrene, rubber hydrochloride, polyethylene, polypropylene, polyvinyl chloride, and polyvinylidene chloride. Our adhesives may be used for the bonding or lamination of any of the above listed substrates.

In the following examples, which further illustrate the embodiment of our invention, all parts given are by weight unless otherwise indicated.

*Example I*

Ths example describes a number of our novel pressure sensitive formulations.

(a) In preparing these formulations, the procedure utilized involved the blending of the respective non-crosslinking and crosslinking polymer lacquers, with the subsequent addition of 0.25%, by weight of the total resin solids, or a para-toluene sulfonic acid catalyst. Formulation #7 was catalyzed with phosphoric acid, rather than with the para-toluene sulfonic acid.

| Formulation No. | Composition of blend ||||||  Total resin solids, percent |
|---|---|---|---|---|---|---|---|
| | Non-crosslinking resin lacquer ||| Crosslinking resin lacquer ||| |
| | Composition | Parts in blend | Solvent | Composition | Parts in blend | Solvent | |
| 1 | 50:50 vinyl acetate:octyl acrylate. | 1 | 4:5 ethyl acetate: toluene. | 50:50:4 vinyl acetate: octyl acrylate:NMA (N-methylol acrylamide). | 1 | 10:0.5:8 ethyl acetate: methyl alcohol:isopropyl alcohol. | 40 |
| 2 | 35:65 vinyl acetate:butyl acrylate. | 2 | do | 35:61:4 vinyl acetate: butyl acrylate:NMA. | 1 | 10:0.5:8 ethyl acetate: methyl alcohol:toluene. | 40 |
| 3 | do | 19 | do | do | 1 | do | 40 |
| 4 | Polyethylacrylate (Tg <−20° C.). | 1 | Ethyl acetate | 100:4 polyethyl acrylate: NMA. | 1 | Ethyl acetate | 50 |
| 5 | do | 1 | do | 100:4 polybutylacrylate: NMA. | 1 | do | 50 |
| 6 | 20:80 vinylidene chloride: butylacrylate. | 1 | 7:1 ethyl acetate: methyl alcohol. | 20:80:2.5 vinylidene chloride:butyl acrylate:NMA. | 1 | 4:1 ethyl acetate:isopropyl alcohol. | 30 |
| 7 | 50:50 octyl acrylate: vinyl acetate. | 1 | 5:4 toluene:ethyl acetate. | 50:50:5 octyl acrylate: vinyl acetate:hydroxyethyl acrylate and 10.5 parts of melamine-formaldehyde resin. | 1 | 5:4 toluene:ethyl acetate | 40 |
| 8 | do | 1 | do | 50:50:5 octyl acrylate: vinyl acetate:glycidyl methacrylate. | 1 | 2.5:2.8:1 toluene: ethyl acetate:methyl ethyl ketone. | 35 |

The above listed formulations exhibited outstanding properties of pressure sensitivity, tack, and cohesive strength.

(b) The procedure as set forth in part (a) of this example was employed to prepare a number of additional adhesive compositions. Thus, all of the formulations set forth in the table of part (a) of this example were duplicated with the exception, however, that no catalytic agents were included to accelerate curing. In each instance, the formulations prepared without the catalyst exhibited properties that were comparable to those of the formulations which contained a catalyst.

*Example II*

This example illustrates the necessity of employing each of the components of our novel compositions in order to attain pressure sensitive adhesives which exhibit extraordinary characteristics of tack, tack retention, and cohesion.

In order to test the cohesive strength of the adhesive compositions, use was made of what is known as the "20° hold" and the "180° cold flow" tests.

In employing the "20° hold" test, films of the respective adhesives were applied to a polyethylene terephthalate film backing in a 3 mil wet thickness. The test samples, which were 1 inch in width and 3 inches in length, were securely adhered by thumb pressure to the top of a ½ inch chrome steel bar tilted 20° from the vertical, the adhered area being that of ½ inch by 1 inch. The portion of the sample that extended downward was folded back approximately 1 inch and a 500 gram weight was secured to the sample. The time required for the sample to fail, that is, for the film to separate from the top of the bar, was recorded as the 20° hold time.

In employing the "180° cold flow" test, test samples were prepared as was set forth for the "20° hold" test. In this procedure, the samples were adhered to a stainless steel or glass panel having a surface contact area of 1 inch by 1 inch. The panel was then suspended at a 90° angle to the horizontal with the tape extending downward. The portion of the sample that extended downward was folded back approximately 1 inch and a 500 gram weight was secured to the sample. The time required for the adhered area of the sample to separate from the panel was recorded as the 180° cold flow time.

| Formulation No. | Resin | Solvent | Total resin solids | 20° hold (sec.) | Cold flow | Tack | |
|---|---|---|---|---|---|---|---|
| | | | | | | Initial | 2 weeks at 140° F. |
| 1 | Vinyl acetate: Octyl acrylate: NMA (50:50:4). | 10:5:8 ethylacetate: methyl alcohol: isopropyl alcohol. | 40 | 350 | No creep, 3 days | Good | Poor. |
| 2 | Vinyl acetate: octyl acrylate (50:50). | 4:5 ethyl acetate: toluene | 40 | 150 | Complete separation, 24 hrs. | Very good | Very good. |
| 3 | 1:1 blend of (1) and (2) | | 40 | 200 | No creep, 3 days | do | Do. |

It can be seen from the results reproduced in the above table that only the unique adhesive blend of our invention produces completely satisfactory compositions.

*Example III*

This example illustrates the preparation of the adhesives of our invention in the form of an aqueous solution.

An emulsion of the non-crosslinking resin was prepared by adding 4 parts of an alkyl phenoxy polyoxyethylene ethanol containing from 5–50 polyoxyethylene units to 100 parts of a 40% resin solids solution of 50:50 vinyl acetate:octyl acrylate copolymer in a 4:5 ethyl acetate: toluene solvent blend. Then, while vigorously agitating the solution, 40 parts of water were introduced into the system, the agitation being continued until an oil-in-water emulsion was produced.

An emulsion of the crosslinking resin was similarly prepared by adding 4 parts of alkyl phenoxy polyoxyethylene ethanol to 100 parts of a 40% resin solids solution of 50:50:4 vinyl acetate:octyl acrylate:N-methylol acrylamide terpolymer in a 10:5:8 ethyl acetate:methyl alcohol:isopropyl alcohol solvent blend. Then, while vigorously agitating the solution, 40 parts of water were introduced into the system, the agitation being continued until an oil-in-water emulsion was produced.

The two previously described emulsions were then blended, and the solvent was removed by vacuum distillation, thereby resulting in a completely aqueous system. The resulting formulation exhibited outstanding properties of pressure sensitivity, tack, and cohesive strength.

Any departure from the above description which conforms to the present invention is intended to be included within the scope of the invention as defined by the following claims.

We claim:
1. A pressure sensitive adhesive composition comprising an organic solvent solution of a mixture of: (a) a non-crosslinking polymer selected from the group consisting of copolymers of vinyl acetate with a comonomer selected from the group consisting of the alkyl esters of acrylic and methacrylic acid wherein said alkyl groups contain from 2 to 8 carbon atoms; copolymers of vinylidene chloride with a comonomer selected from the group consisting of the alkyl esters of acrylic and methacrylic acid wherein said alkyl groups contain from 4 to 8 carbon atoms; and, homopolymers of monomers selected from the group consisting of alkyl esters of acrylic and methacrylic acid wherein said alkyl groups contain from 2 to 8 carbon atoms and wherein said homopolymers have a glass transistion temperature of less than $-20°$ C.; and, (b) and crosslinkable copolymer capable of becoming crosslinked when heated at temperatures in the range of 150° to 275° F., said crosslinkable copolymer comprising a copolymer of at least one of the monomers used in preparing the non-crosslinking polymer of group (a) and at least one crosslinkable comonomer selected from the group consisting of N-methylol acrylamide, N-methylol methacrylamide, glycidyl acrylate, glycidyl methacrylate, hydroxyethyl acrylate, hydroxyethyl methacrylate, hydroxylpropyl acrylate and hydroxypropyl methacrylate.

2. The adhesive composition of claim 1, wherein the ratio of solids of said non-crosslinking polymer to said crosslinkable copolymer ranges from 50:50 to 95:5, by weight.

3. The adhesive composition of claim 1 wherein said crosslinkable copolymer (b) contains from 0.5 to 10% by weight of at least one crosslinkable comonomer, as based on the weight of the resulting copolymer.

4. A substrate coated with the dry film of the composition of claim 1 wherein the crosslinkable copolymer has been crosslinked.

5. A substrate coated with a film comprising the dried, consolidated residue of a pressure sensitive adhesive composition comprising an organic solvent solution of a mixture of: (a) a non-crosslinking polymer selected from the group consisting of copolymers of vinyl acetate with a comonomer selected from the group consisting of the alkyl esters of acrylic and methacrylic acid wherein said alkyl groups contain from 2 to 8 carbon atoms; copolymers of vinylidene chloride with a comonomer selected from the group consisting of the alkyl esters of acrylic and methacrylic acid wherein said alkyl groups contain from 4 to 8 carbon atoms; and, homopolymers of monomers selected from the group consisting of alkyl esters of acrylic and methacrylic acid wherein said alkyl groups contain from 2 to 8 carbon atoms and wherein said homopolymers have a glass transistion temperature of less than $-20°$ C.; and, (b) a crosslinkable copolymer capable of becoming crosslinked when heated at temperatures in the range of 150° to 275° F., said crosslinkable copolymer comprising a copolymer of at least one of the monomers used in preparing the non-crosslinking polymer of group (a) and at least one crosslinkable comonomer selected from the group consisting of N-methylol acrylamide, N- methylol methacrylamide, glycidyl acrylate, glycidyl methacrylate, hydroxyethyl acrylate, hydroxyethyl methacrylate, hydroxypropyl acrylate and hydroxypropyl methacrylate.

References Cited by the Examiner

UNITED STATES PATENTS

| | | | |
|---|---|---|---|
| 2,819,237 | 1/1958 | Daniel | 260—29.6 |
| 2,884,126 | 4/1959 | Ulrich | 117—122 |
| 2,901,448 | 8/1959 | Krans | 260—29.6 |
| 2,923,653 | 2/1960 | Matlin et al. | 260—29.6 |
| 2,925,174 | 2/1960 | Stow | 117—122 |
| 2,984,588 | 5/1961 | Graulich et al. | 260—29.6 |
| 3,100,160 | 8/1963 | Korpman | 117—122 |

FOREIGN PATENTS 624,764 6/1949 Great Britain.

MURRAY TILLMAN, *Primary Examiner.*

LEON J. BERCOVITZ, *Examiner.*